United States Patent
Sun et al.

(10) Patent No.: US 7,724,615 B2
(45) Date of Patent: May 25, 2010

(54) APPARATUS AND METHOD FOR DETERMINING TYPE OF AN OPTICAL DISK

(75) Inventors: Yu-Hung Sun, Taipei (TW); Chih-Hao Chang, Taipei (TW)

(73) Assignee: Lite-On It Corporation, Taipei (TW)

( * ) Notice: Subject to any disclaimer, the term of this patent is extended or adjusted under 35 U.S.C. 154(b) by 707 days.

(21) Appl. No.: 11/513,278

(22) Filed: Aug. 31, 2006

(65) Prior Publication Data
US 2007/0053253 A1    Mar. 8, 2007

(30) Foreign Application Priority Data
Sep. 2, 2005    (TW) .............................. 94130157 A

(51) Int. Cl.
*G11B 7/00*    (2006.01)
*G11B 11/00*    (2006.01)

(52) U.S. Cl. ................... 369/44.13; 369/53.23

(58) Field of Classification Search ....................... None
See application file for complete search history.

(56) References Cited

U.S. PATENT DOCUMENTS

| | | | | |
|---|---|---|---|---|
| 5,767,780 A | * | 6/1998 | Smith et al. ................. | 340/648 |
| 2002/0075780 A1 | * | 6/2002 | Ogihara ................... | 369/53.23 |
| 2004/0109399 A1 | * | 6/2004 | Kaneshige ............... | 369/59.22 |

* cited by examiner

*Primary Examiner*—Wayne R Young
*Assistant Examiner*—Carl Adams
(74) *Attorney, Agent, or Firm*—Bacon & Thomas, PLLC

(57) ABSTRACT

An apparatus and a method for determining the type of an optical disk are provided. Firstly, an RF signal of the optical disk in an optical disk drive is read out. Next, a bandpass signal is extracted from the RF signal by a bandpass filter whose central frequency is a wobble frequency. Then, whether the bandpass signal corresponds to a wobble signal is determined. If so, the optical disk is a recordable optical disk; otherwise, the optical disk is a read-only optical disk.

10 Claims, 5 Drawing Sheets

APPARATUS AND METHOD FOR DETERMINING TYPE OF AN OPTICAL DISK

This application claims the benefit of Taiwan application Serial No. 94130157, filed Sep. 2, 2005, the subject matter of which is incorporated herein by reference.

BACKGROUND OF THE INVENTION

1. Field of the Invention

The invention relates in general to an optical disk apparatus, and more particularly to an apparatus and a method for determining the type of an optical disk.

2. Description of the Related Art

The optical disk is capable of storing a large amount of data and features the function of data storage; therefore, various types of optical disks are invented to meet users' various needs of data storage.

Currently, the optical disks can be categorized into the read-only optical disks and the recordable optical disks. Examples of read-only optical disks include CD-ROM disks, DVD-ROM disks, and so on. Examples of recordable optical disks include CD-R disks, CD-RW disks, DVD-R/RW disks, DVD+R/RW disks and so on. Normally, after an optical disk is placed into an optical disk drive, the optical disk drive has to determine the type of the optical disk for further processing such as adjusting the read/write power or adjusting the optimum rate of rotation.

Normally, the type of an optical disk may be determined according to the surface reflectivity of the optical disk because various types of optical disks are made of different materials. However, due to the large variety of the dye used in the recordable optical disk and the big difference existing on the surface reflectivity of read-only optical disks made of various materials, it is difficult to determine the type of an optical disk according to the surface reflectivity of the optical disk.

SUMMARY OF THE INVENTION

It is therefore an object of the invention to provide an apparatus and a method for determining the type of an optical disk according to a spiral groove on the optical disk.

The invention achieves the above-identified object by providing a method for determining the type of an optical disk. Firstly, a radio frequency (RF) signal of the optical disk in an optical disk drive is read out. Next, a bandpass signal is extracted from the RF signal by a bandpass filter whose central frequency is the wobble frequency. Then, a determination is made as to whether the bandpass signal corresponds to a wobble signal. If so, the optical disk is a recordable optical disk; otherwise, the optical disk is a read-only optical disk.

The invention further achieves the above-identified object by providing an optical disk drive for determining whether an optical disk is a read-only optical disk or a recordable optical disk. The optical disk drive includes an optical pick-up head for reading an RF signal from the optical disk. The first bandpass filter whose central frequency is a wobble frequency is used for extracting a first bandpass signal from the RF signal. The determining unit determines whether the first bandpass signal corresponds to a wobble signal is determined. If so, the optical disk is a recordable optical disk; otherwise, the optical disk is a read-only optical disk.

Other objects, features, and advantages of the invention will become apparent from the following detailed description of the preferred but non-limiting embodiments. The following description is made with reference to the accompanying drawings.

DETAILED DESCRIPTION OF THE INVENTION

The recordable optical disk is different from the read-only optical disk in terms of physical structure, such as wobbles. The recordable optical disk has a spiral groove which slightly wobbles along the radial direction of the optical disk. By detecting the span of wobbling, a wobble signal is obtained. The wobble signal is related to the information of the optical disk such as address and is pre-recorded in the optical disk. The read-only optical disk does not have a spiral groove. Thus, the type of optical disk may be determined according to whether a spiral groove is detected.

Figure 1A:
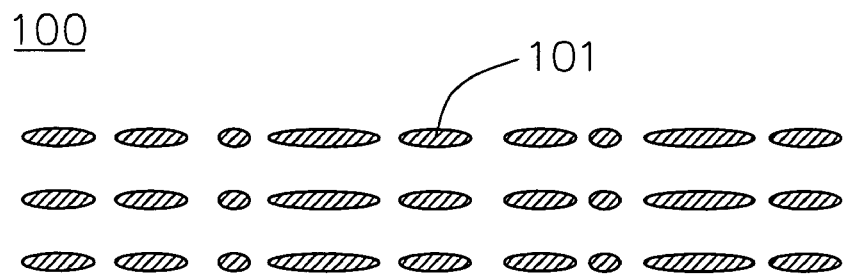
FIGS. 1A and 1B (Related Art) are diagrams respectively illustrating the tracks of a read-only optical disk and a recordable optical disk respectively.
Figure 1B:
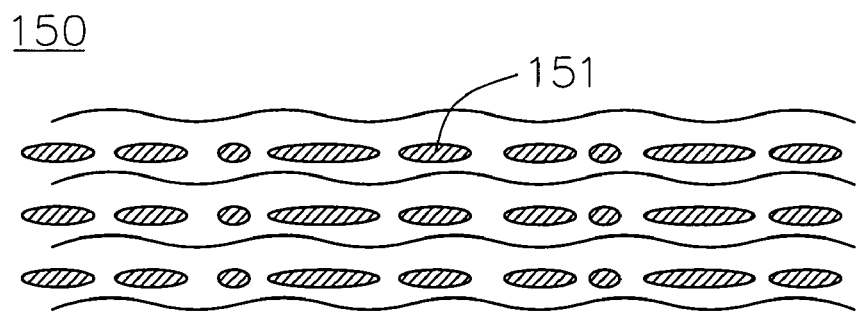

Referring to FIG. 1A and 1B, the tracks of a read-only optical disk and a recordable optical disk are shown. In FIG. 1A, the track of the read-only optical disk 100 includes continuous pits 101 for recording data. The pits 101 are pre-engraved on the optical disk. In FIG. 1B, the recordable optical disk 150 has a spiral groove which is pre-engraved on the optical disk. The spiral groove slightly wobbles along the radial direction of the optical disk. The pits 151 on the track are for recording data in the spiral groove.

DVD+R/RW optical disks use a physical addressing scheme called address in pre-groove (ADIP). Disk information of the optical disk is recorded by way of wobbling of the spiral groove modulated by a phase shifted keying (PSK) modulation with a modulating frequency of 817 KHz. When the optical disk drive operates at the speed of nX, the sampling frequency is n*817 KHz for sampling the wobble signal recorded in the spiral groove, wherein n indicates the optical disk drive operates at a data transfer rate of n times a single speed X. The single speed X depends on the type of disk, and for DVD, for example, it is a data transfer rate of about 36 Mbps.

DVD-R/RW optical disks use another physical addressing scheme called land pre-pits (PPIT). Disk information of the DVD-R/RW optical disk is recorded in the spiral groove of the optical disk, using frequency modulation with a modulating frequency of 140 KHz. When the optical disk drive operates at the speed of nX, the sampling frequency is n*140 KHz for sampling the wobble signal recorded in the spiral groove.

As for CD-R/RW optical disks, a carrier wave having modulating frequency at 22 KHz is used to record disk information of the optical disk in the spiral groove. When the optical disk drive operates at the speed of nX, the sampling frequency is n*22 KHz for sampling the wobble signal recorded in the spiral groove, wherein n indicates the optical disk drive operates at a data transfer rate of n times a single speed X. The single speed X for CD, for example, is a data transfer rate of about 150 KB/s.

Figure 2A:
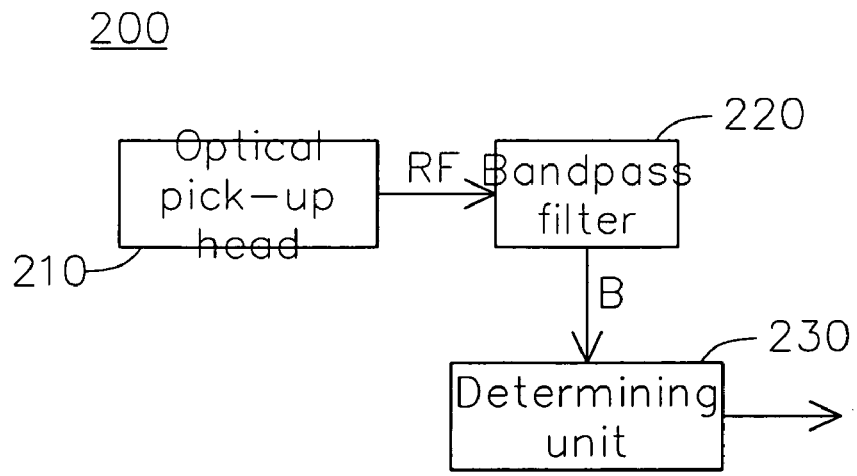
FIG. 2A is a block diagram of an optical disk drive according to a first embodiment of the invention.

FIG. 2A is a block diagram of an optical disk drive according to a first embodiment of the invention. The optical disk drive 200 determines the type of an optical disk according to whether a wobble signal is detected. The optical disk drive 200 includes an optical pick-up head 210, a bandpass filter 220 and a determining unit 230. The optical pick-up head 210 is for reading an optical disk and outputting a radio frequency signal RF. The bandpass filter 220 filters the radio frequency signal RF to output a bandpass signal B. Next, the determining unit 230 determines whether the bandpass signal B corresponds to the wobble signal. If so, it indicates that the optical disk has a spiral groove and is a recordable optical disk; otherwise, the optical disk is a read-only optical disk.

The determining unit 230 determines whether the bandpass signal B corresponds to the wobble signal according to the frequency spectrum or the period of the bandpass signal B.

Figure 2B:
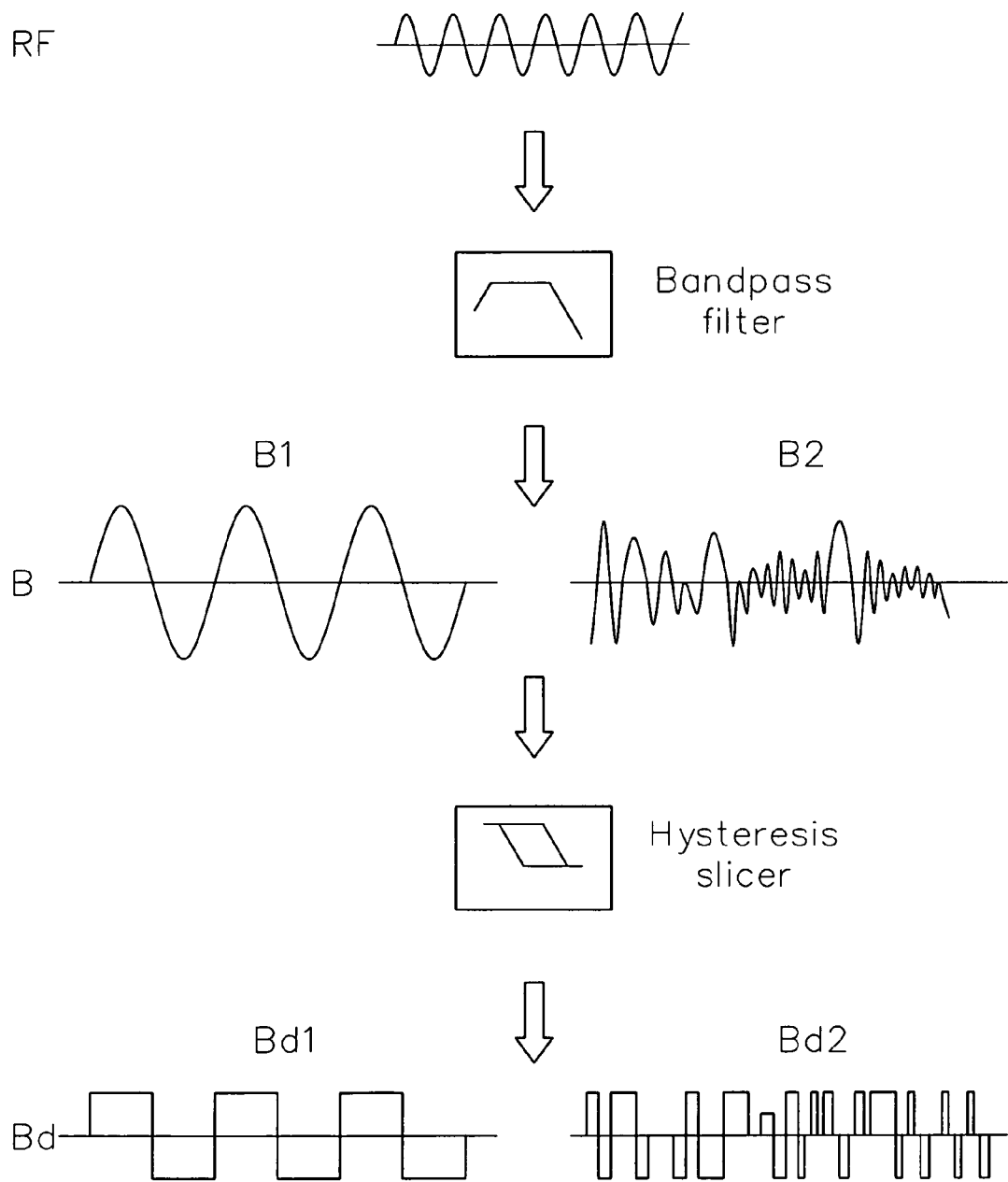
FIG. 2B is a waveform diagram of signals in an optical disk drive.

Referring to FIG. 2B, a waveform diagram of radio frequency signals in an optical disk drive is shown. After the radio frequency signal RF outputted from the optical pick-up head 210 passes through the bandpass filter 220, a bandpass signal B is generated. The central frequency of the bandpass filter 220 may be set to 22 kHz, 140 kHz, or 817 kHz. If the bandpass signal B is a wobble signal, then the waveform of the bandpass signal B is like the bandpass signal B1 depicted in the left hand side of FIG. 2B. Otherwise, the waveform of the bandpass signal B is like the bandpass signal B2 depicted in the right hand side of FIG. 2B.

The method of determining whether the bandpass signal corresponds to the wobble signal according to the period of the bandpass signal B is disclosed as follows. The bandpass signal B is digitalized by the hysteresis slicer (not illustrated) of the determining unit 230 and then the period of the bandpass signal is checked. The bandpass signal B, having been processed by a hysteresis slicer, outputs a digital bandpass signal Db. The digital bandpass signal Db1 corresponds to the bandpass signal B1 having a wobble signal and has a single period, while the digital bandpass signal Db2 corresponds to the bandpass signal B2 not having a wobble signal and does not have a single period. Therefore, whether the optical disk has a wobble signal may be determined according to the period of the digital bandpass signal Db, and whether the optical disk is a recordable disk or a read-only disk is determined accordingly.

The method of determining whether the bandpass signal corresponds to the wobble signal according to the frequency spectrum of the bandpass signal B is disclosed below. If the intensity of the frequency component of the bandpass signal B at the wobble frequency is large enough, such as larger than an intensity threshold, then the bandpass signal B corresponds to the wobble signal; otherwise, the bandpass signal B does not correspond to the wobble signal.

Figure 3:
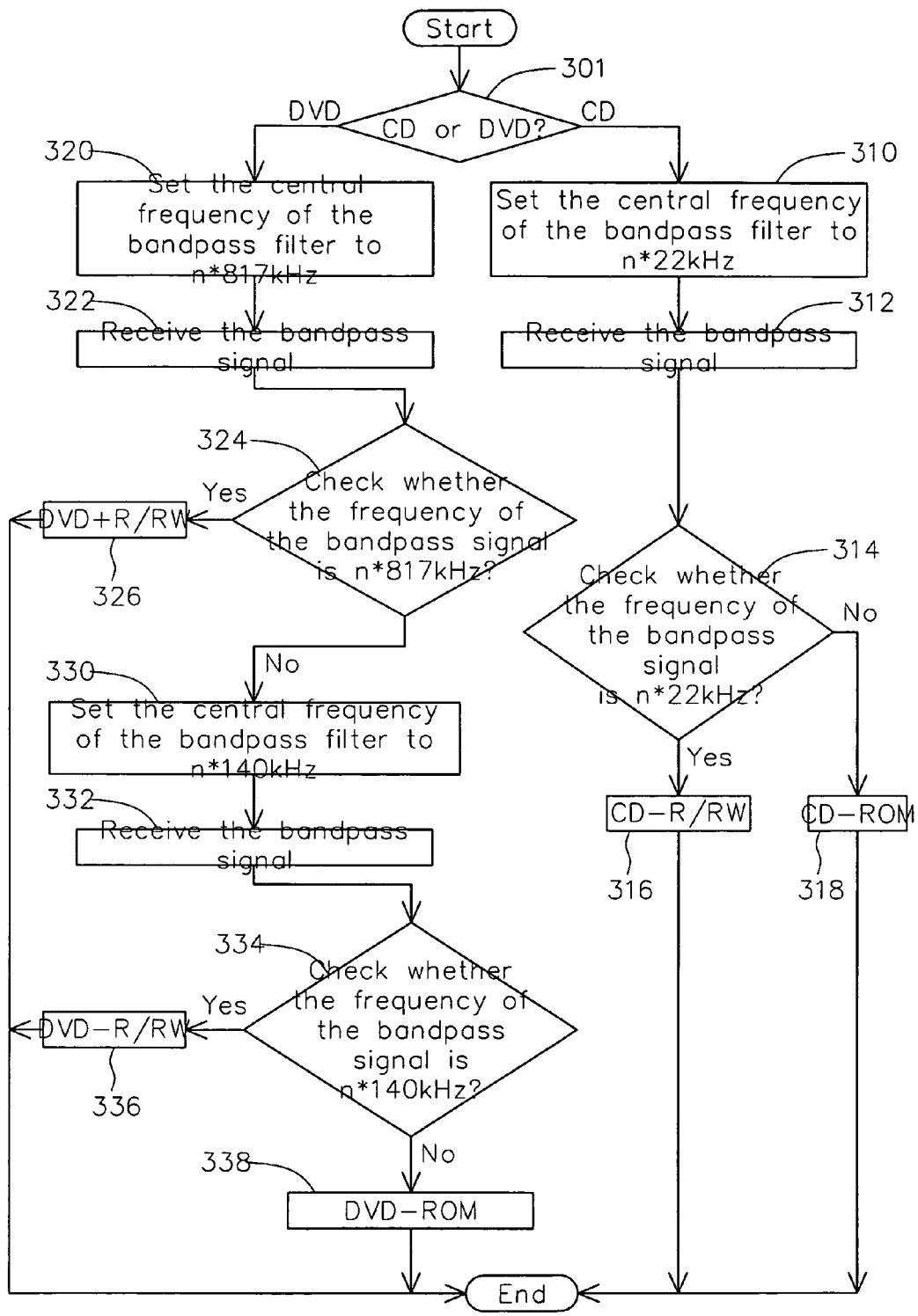
FIG. 3 is a flowchart for a method of determining the type of an optical disk according to a second embodiment of the invention.

FIG. 3 is a flowchart for a method of determining the type of an optical disk according to a second embodiment of the invention. Firstly, the method begins at step 301 in order to determine whether the optical disk is a CD or a DVD. If the optical disk is a CD, the method proceeds to step 310. If the optical disk is a DVD, the method proceeds to step 320. In step 310, the central frequency of the bandpass filter 220 is set to n*22 kHz, wherein n indicates the optical disk drive operating at n times a single speed for the optical disk drive. Next, the bandpass signal B outputted by the bandpass filter 220 is received, as indicated in step 312. Then, step 314 is performed to determine whether a frequency component n*22 kHz dominates the frequency components of the bandpass signal B. If so, the bandpass signal B is a wobble signal; that is, the optical disk has a spiral groove and is a recordable optical disk CD-R/RW (step 316). Otherwise, the optical disk is a read-only CD (step 318).

In the step of determining the type of a DVD optical disk, firstly, the central frequency of the bandpass filter 220 is set to n*817 kHz as shown in step 320, wherein n indicates the optical disk drive operating at n times a single speed for the optical disk drive. Next, the bandpass signal B outputted by the bandpass filter 220 is received, as indicated in step 322. Then, step 324 is performed to determine whether the frequency components of the bandpass signal B is dominated by a frequency component of n*817 kHz. If so, the bandpass signal B is a wobble signal; that is, the optical disk has a spiral groove and is determined to be a recordable optical disk DVD+R/RW (step 326). Otherwise, the method proceeds to step 330.

In step 330, the central frequency of the bandpass filter 220 is set to n*140 kHz as shown in step 320, wherein n indicates the optical disk drive operating at n times a single speed for the optical disk drive. Next, the bandpass signal B outputted by the bandpass filter 220 is received, as indicated in step 332. Then, step 334 is performed to determine whether the frequency components of the bandpass signal B is dominated by a frequency component of n*140 kHz. If so, the bandpass signal B is a wobble signal; that is, the optical disk has a spiral groove and is determined to be a recordable optical disk DVD-R/RW (step 336). Otherwise, the optical disk is a read-only DVD (step 338).

In the second embodiment disclosed above, whether the bandpass signal B is a wobble signal is directly determined according to the frequency of the bandpass signal B. However, the determination may be erroneous since the bandpass signal B may be mixed with other frequency components. Thus, a third embodiment is provided to determine whether the bandpass signal B has a wobble signal more accurately.

Figure 4A:
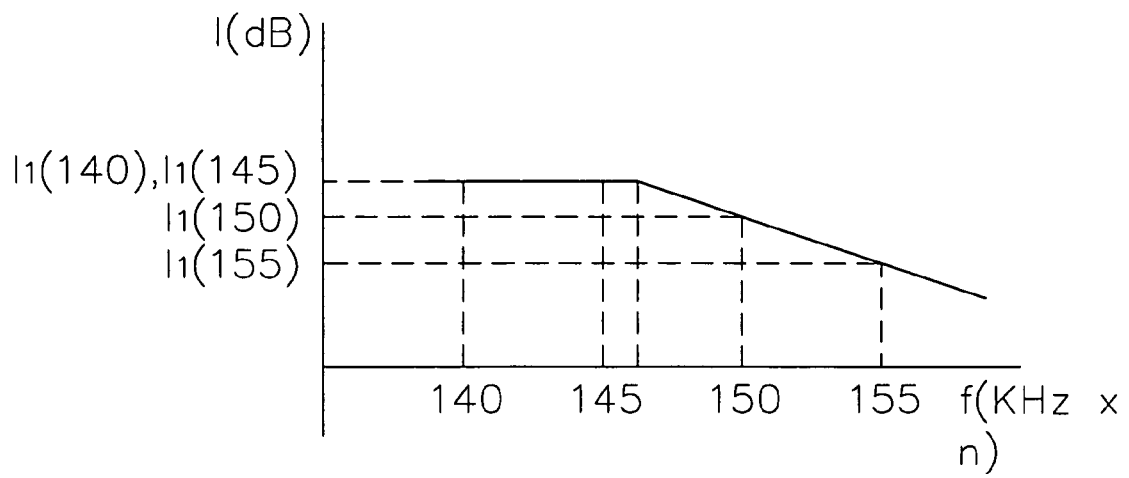
FIGS. 4A and 4B are respective frequency spectrums of the bandpass signals having and not having a wobble signal.
Figure 4B:
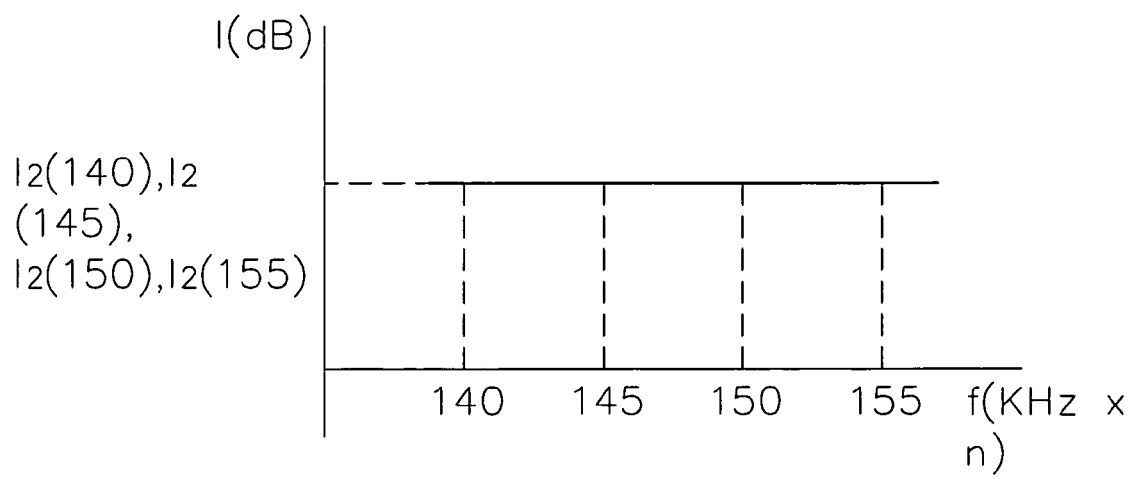

Referring to FIG. 4A or 4B, FIG. 4A is the frequency spectrum of the bandpass signal B1 having a wobble signal, and FIG. 4B is the frequency spectrum of bandpass signal B2 not having a wobble signal. In FIG. 4A, the wobble signal of n*140 kHz is taken for example, and the intensity I1 of the frequency components, after n*140 kHz, of the bandpass signal B1 having the wobble signal will decay. That is, the sum of the intensity I1 (140) at n*140 kHz and the intensity I1 (145) at n*145 kHz is larger than the sum of the intensity I1 (150) at n*150 kHz and the intensity I1 (155) at n*155 kHz, that is, I1(140)+I1(145)>I1(150)+I1(155).

FIG. 4B, the intensity I2 of the frequency components of the bandpass signal B2 not having the wobble signal at around n*140 kHz is approximately the same. That is, I2(140)+I2(145)≈I2(150)+I2(155). Therefore, whether the bandpass signal B has a wobble signal may be determined according to the decay characteristics of the intensity of the frequency components of the bandpass signal.

Figure 5:
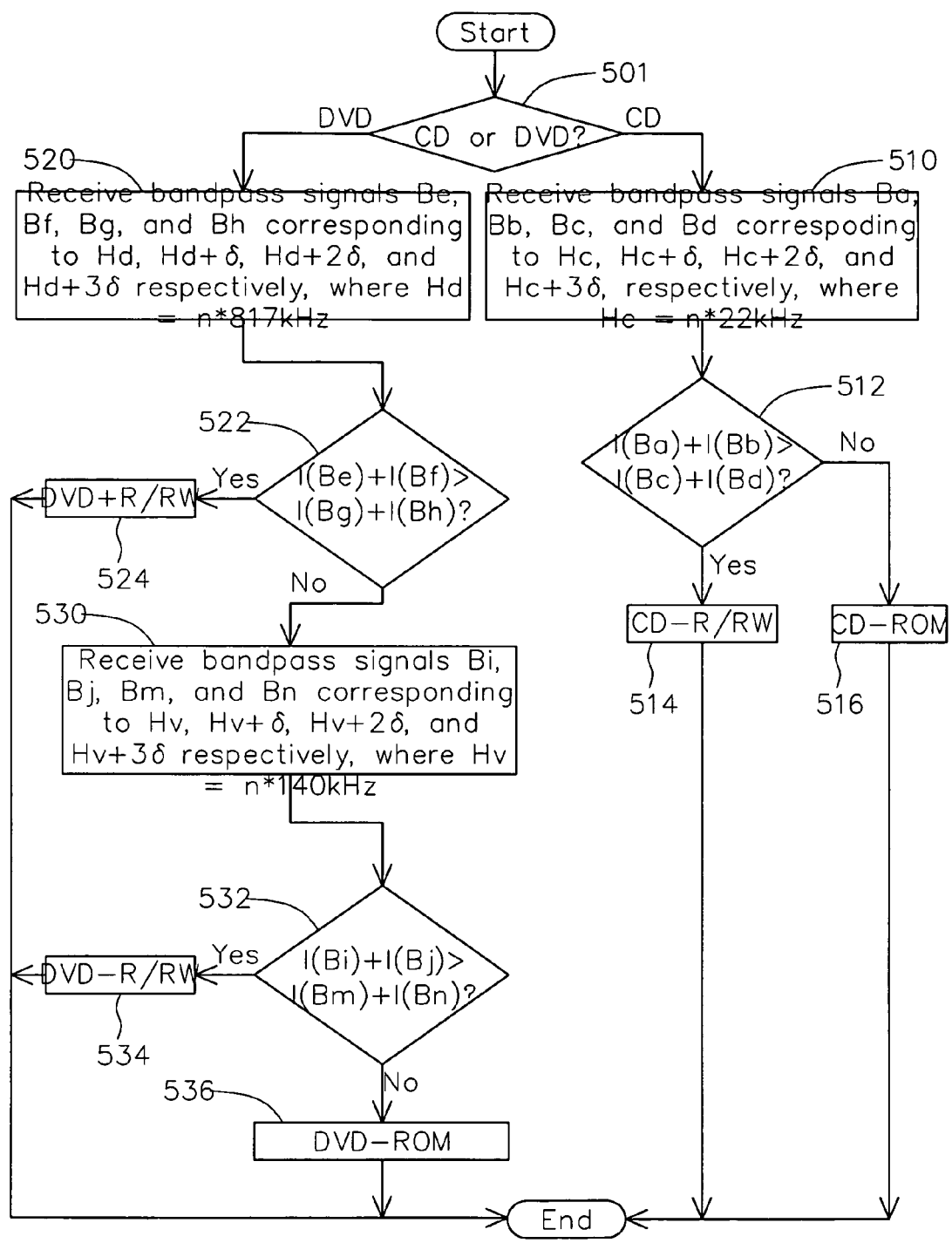
FIG. 5 is a flowchart for a method of determining the type of an optical disk according to a third embodiment of the invention.

FIG. 5 is a flowchart for a method of determining the type of an optical disk according to a third embodiment of the invention. Firstly, the method begins at step 501, whether the optical disk is a CD or a DVD is determined. If the optical disk is a CD, the method proceeds to step 510. Otherwise, the method proceeds to step 520 if the optical disk is a DVD. In step 510, the central frequency of the bandpass filter 220 is sequentially set to Hc, Hc+δ, Hc+2δ, and Hc+3δ, and the corresponding bandpass signals Ba, Bb, Bc, and Bd outputted by the bandpass filter 220 are received, wherein Hc is n*22 kHz, n indicates the optical disk drive operating at n times a single speed for the optical disk drive, and the offset value δ is n*1 kHz for instance. Next, in step 512, it is determined whether I(Ba)+I(Bb)>I(Bc)+I(Bd). If so, the optical disk has a spiral groove and is determined to be a recordable optical disk CD-R/RW (step 514); otherwise, the optical disk is a read-only CD (step 516). It is noted that in step 510, the bandpass filter 220 may be set to a different number of central frequencies sequentially in addition to the four different central frequencies, wherein the number of central frequencies may be adjusted according to actual needs.

In step 520, the central frequency of the bandpass filter 220 is sequentially set to Hd, Hd+δ, Hd+2δ, and Hd+3δ, and the corresponding bandpass signals Be, Bf, Bg, and Bh outputted by the bandpass filter 220 are received, wherein Hd is n*817 kHz, n indicates the optical disk drive operating at n times a single speed for the optical disk drive, and the offset value δ is n*20 kHz for instance. Next, in step 522, whether I(Be)+I(Bf)>I(Bg)+I(Bh) is determined. If so, the optical disk has a spiral groove and is determined to be a recordable optical disk DVD+R/RW (step 524); otherwise, the method proceeds to step 530. It is noted that in step 520, the bandpass filter 220 may be set to a different number of central frequencies sequentially in addition to the four different central frequencies, wherein the number of central frequencies may be adjusted according to actual needs.

In step 530, the central frequency of the bandpass filter 220 is sequentially set to Hv, Hv+δ, Hv+2δ, and Hv+3δ, and the corresponding bandpass signals Bi, Bj, Bm, and Bn outputted by the bandpass filter 220 are received, wherein Hv is n*140 kHz, n indicates the optical disk drive operating at n times a single speed for the optical disk drive, and the offset value δ is n*5 kHz for instance. Next, in step 532, the intensities of the bandpass signals are compared to check whether I(Bi)+I(Bj)>I(Bm)+I(Bn). If so, the optical disk has a spiral groove and is determined to be a recordable optical disk DVD-R/RW (step 534), otherwise the optical disk is a DVD-ROM (step 536). It is noted that in step 530, the bandpass filter 220 may be set to a different number of central frequencies sequentially in addition to the four different central frequencies, wherein the number of central frequencies may be adjusted according to actual needs.

The apparatus and method for determining the type of an optical disk disclosed in the above embodiment of the invention are capable of accurately determining the type of an optical disk according to the wobble signal.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for determining the type of an optical disk, the method comprising:
reading a radio frequency (RF) signal from the optical disk;
determining the optical disk disposed in an optical disk drive is a CD type disk or a DVD type disk, if it is determined that the disk is the CD type:
setting the central frequency of a bandpass filter whose central frequency includes a first, second and third frequency to be the first frequency and extracting a first bandpass signal from the RF signal by the bandpass filter, wherein the third frequency is larger than the first frequency and smaller than the second frequency;
setting the central frequency of the bandpass filter to a fourth frequency by adding a first offset value to the first frequency to extract a fourth bandpass signal from the RF signal, wherein the first offset value is smaller than the first frequency;
setting the central frequency of the bandpass filter to a fifth frequency by adding a second offset value to the first frequency to extract a fifth bandpass signal from the RF signal, wherein the second offset value is larger than the first offset value and smaller than the first frequency;
setting the central frequency of the bandpass filter to a sixth frequency by adding a third offset value to the first frequency to extract a sixth bandpass signal from the RF signal, wherein the third offset value is larger than the second offset value and smaller than the first frequency; and
comparing a first intensity sum of the first bandpass signal and the fourth bandpass signal with a second intensity sum of the fifth bandpass signal and the sixth bandpass signal; if the first intensity sum is larger than second intensity sum, determining that the optical disk is a recordable CD; otherwise, determining that the optical disk is a read-only CD;
if it is determined that the disk is the DVD type:
setting the central frequency of the bandpass filter to the second frequency to extract a second bandpass signal from the RF signal;
setting the central frequency of the bandpass filter to a seventh frequency by adding a fourth offset value to the second frequency to extract a seventh bandpass signal from the RF signal, wherein the fourth offset value is smaller than the first frequency;
setting the central frequency of the bandpass filter to an eighth frequency by adding a fifth offset value to the second frequency to extract an eighth bandpass signal from the RF signal, wherein the fifth offset value is larger than the fourth offset value and smaller than the first frequency;
setting the central frequency of the bandpass filter to a ninth frequency by adding a sixth offset value to the second frequency to extract a ninth bandpass signal from the RF signal, wherein the sixth offset value is larger than the fifth offset value and smaller than the first frequency; and
comparing a third intensity sum of the second bandpass signal and the seventh bandpass signal with a fourth intensity sum of the eighth bandpass signal and the ninth bandpass signal; if the third intensity sum is larger than the fourth intensity sum, determining that the optical disk is a recordable DVD of a first type.

2. The method according to claim 1, further comprising:
if the third intensity sum is smaller than the fourth intensity sum:
setting the central frequency of the bandpass filter to the third frequency to extract a third bandpass signal from the RF signal;
setting the central frequency of the bandpass filter to a tenth frequency by adding a seventh offset value to the third frequency to extract a tenth bandpass signal from the RF signal, wherein the seventh offset value is smaller than the first frequency;
setting the central frequency of the bandpass filter to an eleventh frequency by adding an eighth offset value to the third frequency to extract an eleventh bandpass signal from the RF signal, wherein the eighth offset value is larger than the seventh offset value and smaller than the first frequency;
setting the central frequency of the bandpass filter to a twelfth frequency by adding a ninth offset value to the third frequency to extract a twelfth bandpass signal from the RF signal, wherein the ninth offset value is larger than the eighth offset value and smaller than the first frequency; and comparing a fifth intensity sum of the third bandpass signal and the tenth bandpass signal with a sixth intensity sum of the eleventh bandpass signal and the twelfth bandpass signal; if the fifth intensity sum is larger than the sixth intensity sum, determining that the optical disk is a recordable DVD of a second type; otherwise, determining that the optical disk is a read-only DVD.

3. The method according to claim 2, wherein the third frequency is n*140 KHz, n indicates that the optical disk operates at n times a single speed, and the recordable DVD of the second type is a DVD-R/RW optical disk.

4. The method according to claim 1, wherein the second frequency is n*817 KHz, n indicates the optical disk drive operating at n times a single speed, and the recordable DVD of the first type is a DVD+R/RW optical disk.

5. The method according to claim 1, wherein the first frequency is n*22 KHz, n indicates that the optical disk operates at n times a single speed, and the recordable CD is a CD-R/RW.

6. An optical disk drive for determining whether an optical disk is a read-only optical disk or a recordable optical disk, wherein the optical disk drive comprises:

an optical pick-up head for reading an RF signal from the optical disk;

a bandpass filter whose central frequency includes a first, a second and a third frequency for extracting bandpass signals from the RF signal, wherein the third frequency is larger than the first frequency and smaller than the second frequency; and a determining unit for determining the optical disk disposed in an optical disk drive is a CD type disk or a DVD type disk; if it is determined that the disk is the CD type, the determining unit sets:

the central frequency of the bandpass filter to the first frequency to extract a first bandpass signal from the RF signal;

the central frequency of the bandpass filter to a fourth frequency by adding a first offset value to the first frequency to extract a fourth bandpass signal from the RF signal, and the first offset value is smaller than the first frequency;

the central frequency of the bandpass filter to a fifth frequency by adding a second offset value to the first frequency to extract a fifth bandpass signal from the RF signal, wherein the second offset value is larger than the first offset value and smaller than the first frequency; and the central frequency of the bandpass filter to a sixth frequency by adding a third offset value to the first frequency to extract a sixth bandpass signal from the RF signal, wherein the third offset value is larger than the second offset value and smaller than the first frequency;

wherein the determining unit compares a first intensity sum of the first bandpass signal and the fourth bandpass signal with a second intensity sum of the fifth bandpass signal and the sixth bandpass signal; if the first intensity sum is larger than second intensity sum, determining that the optical disk is a recordable CD; otherwise, determining that the optical disk is a read-only CD;

if it is determined that the disk is the DVD type, the determining unit sets:

the central frequency of the bandpass filter to the second frequency to extract a second bandpass signal from the RF signal;

the central frequency of the bandpass filter to a seventh frequency by adding a fourth offset value to the second frequency to extract a seventh bandpass signal from the RF signal, wherein the fourth offset value is smaller than the first frequency;

the central frequency of the bandpass filter to an eighth frequency by adding a fifth offset value to the second frequency to extract an eighth bandpass signal from the RF signal, wherein the fifth offset value is larger than the fourth offset value and smaller than the first frequency; and the central frequency of the bandpass filter to a ninth frequency by adding a sixth offset value to the second frequency to extract a ninth bandpass signal from the RF signal, wherein the sixth offset value is larger than the fifth offset value and smaller than the first frequency;

wherein the determining unit compares a third intensity sum of the second bandpass signal and the seventh bandpass signal with a fourth intensity sum of the eighth bandpass signal and the ninth bandpass signal; if the third intensity sum is larger than the fourth intensity sum, determining that the optical disk is a recordable DVD of a first type.

7. The optical disk drive according to claim 6, wherein: if the third intensity sum is smaller than the fourth intensity sum, the determining unit sets:

the central frequency of the bandpass filter to the third frequency to extract a third bandpass signal from the RF signal;

the central frequency of the bandpass filter to a tenth frequency by adding a seventh offset value to the third frequency to extract a tenth bandpass signal from the RF signal, wherein the seventh offset value is smaller than the first frequency;

the central frequency of the bandpass filter to an eleventh frequency by adding an eighth offset value to the third frequency to extract an eleventh bandpass signal from the RF signal, wherein the eighth offset value is larger than the seventh offset value and smaller than the first frequency; and the central frequency of the bandpass filter to a twelfth frequency by adding a ninth offset value to the third frequency to extract a twelfth bandpass signal from the RF signal, wherein the ninth offset value is larger than the eighth offset value and smaller than the first frequency;

wherein the determining unit compares a fifth intensity sum of the third bandpass signal and the tenth bandpass signal to a sixth intensity sum of the eleventh bandpass signal and the twelfth bandpass signal: if the fifth intensity sum is larger than sixth intensity sum, determining that the optical disk is a recordable DVD of a second type; otherwise, determining that the optical disk is a read-only DVD.

8. The optical disk drive according to claim 7, wherein the third frequency is n* 140 KHz, n indicates the optical disk drive operating at n times a single speed, and the recordable DVD of the second type is DVD-R/RW optical disk.

9. The optical disk drive according to claim 6, wherein the second frequency is n*817 KHz, n indicates the optical disk drive operating at n times a single speed, and the recordable DVD of the first type is a DVD+R/RW optical disk.

10. The optical disk drive according to claim 6, wherein the first frequency is n*22 KHz, n indicates the optical disk drive operating at n times a single speed, and the recordable CD is a CD-R/RW optical disk.

* * * * *